(12) United States Patent
Sun (10) Patent No.: US 11,516,554 B2
(45) Date of Patent: Nov. 29, 2022

(54) METHOD AND SYSTEM FOR ENHANCING SOUND AND PICTURE QUALITY BASED ON SCENE RECOGNITION, AND DISPLAY

(71) Applicant: SHENZHEN SKYWORTH-RGB ELECTRONIC CO., LTD., Shenzhen (CN)

(72) Inventor: Sikai Sun, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/272,095

(22) PCT Filed: Sep. 15, 2020

(86) PCT No.: PCT/CN2020/115376
§ 371 (c)(1),
(2) Date: Feb. 26, 2021

(87) PCT Pub. No.: WO2021/109673
PCT Pub. Date: Jun. 10, 2021

(65) Prior Publication Data
US 2022/0124417 A1    Apr. 21, 2022

(30) Foreign Application Priority Data
Dec. 6, 2019 (CN) .......................... 201911242161.0

(51) Int. Cl.
*H04N 21/485* (2011.01)
*G06V 20/40* (2022.01)
(Continued)

(52) U.S. Cl.
CPC ......... *H04N 21/4854* (2013.01); *G06V 10/82* (2022.01); *G06V 20/46* (2022.01);
(Continued)

(58) Field of Classification Search
CPC ............. H04N 21/4854; H04N 21/439; H04N 21/44008; H04N 21/4852; G06V 20/46; G06V 10/82
See application file for complete search history.

(56) References Cited

U.S. PATENT DOCUMENTS

2013/0162867 A1\* 6/2013 Gupta ................... G06V 10/28
                                                          348/239
2015/0058877 A1    2/2015 Lakkundi et al.
(Continued)

FOREIGN PATENT DOCUMENTS

CN    105898364 A    8/2016
CN    106534942 A    3/2017
(Continued)

OTHER PUBLICATIONS

First Office Action issued in counterpart Chinese Patent Application No. 201911242161.0, dated Sep. 27, 2020.
(Continued)

*Primary Examiner* — Mishawn N. Hunter
(74) *Attorney, Agent, or Firm* — Westbridge IP LLC (57) ABSTRACT

Disclosed are a method and a system for enhancing sound and picture quality based on scene recognition, and a display. The method includes: recognizing a real scene reflected in a current screen of the display; calculating sound and picture quality enhancement parameters matching the real scene; and controlling the display to play sound and picture corresponding to the real scene according to best sound and picture quality corresponding to the sound and picture quality enhancement parameters.

14 Claims, 7 Drawing Sheets

(51) Int. Cl.
*G06V 10/82* (2022.01)
*H04N 21/439* (2011.01)
*H04N 21/44* (2011.01)

(52) U.S. Cl.
CPC ..... *H04N 21/439* (2013.01); *H04N 21/44008* (2013.01); *H04N 21/4852* (2013.01)

(56) References Cited

U.S. PATENT DOCUMENTS

2017/0278546 A1  9/2017  Xiao et al.
2019/0327526 A1  10/2019  Navin et al.

FOREIGN PATENT DOCUMENTS

| CN | 108710847 | A | 10/2018 | |
| CN | 108712674 | A | 10/2018 | |
| CN | 108846351 | A | 11/2018 | |
| CN | 108921040 | A | 11/2018 | |
| CN | 110996153 | A | 4/2020 | |
| EP | 2840800 | A1 | 2/2015 | |
| WO | PCT/US2018/019060 | * | 2/2018 | ........... G06K 9/6267 |

OTHER PUBLICATIONS

International Search Report and Written Opinion issued in corresponding PCT Application No. PCT/CN2020/115376, dated Dec. 2, 2020.
Second Office Action issued in counterpart Chinese Patent Application No. 201911242161.0, dated Apr. 21, 2021.
Brezeale et al., Automatic Video Classification: A Survey of the Literature, IEEE Transactions On Systems, Man, and Cybernetics-Part C: Applications and Reviews, vol. 38, No. 3, pp. 416-430, dated May 1, 2008.
Examination Report issued in counterpart Indian Patent Application No. 202127012494, dated Jul. 8, 2022.
Mazumdar et al., Object Recognition in Videos by Sequential Frame Extraction using Convolutional Neural Networks and Fully Connected Neural Networks, International Conference on Energy, Communication, Data Analytics and Soft Computing (ICECDS-2017), pp. 1485-1488, dated Aug. 1, 2017.
Supplementary European Search Report issued in counterpart European Patent Application No. 20861983.3, dated Jul. 26, 2022.

* cited by examiner

METHOD AND SYSTEM FOR ENHANCING SOUND AND PICTURE QUALITY BASED ON SCENE RECOGNITION, AND DISPLAY

CROSS-REFERENCE TO RELATED APPLICATIONS

This application is a National Stage of International Application No. PCT/CN2020/115376, filed on Sep. 15, 2020, which claims priority to Chinese Application No. 201911242161.0, filed on Dec. 6, 2019, filed with China National Intellectual Property Administration, and entitled "METHOD AND SYSTEM FOR ENHANCING SOUND AND PICTURE QUALITY BASED ON SCENE RECOGNITION, AND DISPLAY", the entire disclosure of which is incorporated herein by reference.

TECHNICAL FIELD

The present disclosure relates to the technical field of displays, in particular to a method and a system for enhancing sound and picture quality based on scene recognition, and a display.

BACKGROUND

With the development of display technology, a large number of increasingly intelligent display devices, such as smart TVs, appear on the market. Smart TV is a new TV product with a fully open platform and an operating system. In recent years, with the development of artificial intelligence technology, smart TVs have become more and more powerful, bringing users a richer personalized audio-visual experience.

Smart TVs can usually provide high-definition picture display and natural sound effects. However, due to the limitations of actual playback conditions, the sound and picture quality of programs played by smart TVs often does not meet the highest sound and picture quality requirements that smart TVs can achieve. For example: the resolution of a 4k TV is 3840*2160, and the pixels of the screen of the program played by the TV are 1920*1080. Even if the resolution provided by the TV itself is relatively high, it is difficult to play high-definition pictures. In order to solve such problems, the related art uses sound and picture enhancement technologies to repair the picture and sound to improve the picture and sound quality of the TV, making the picture content have more layers and the sound effect more in line with people's expectations. For example, small apertures, low scene contrast, overexposure, etc. can all be solved by the picture enhancement technology to significantly improve picture quality.

However, the existing picture and sound enhancement technologies are often not smart enough, and the picture and sound enhancement technologies they provide are often too single for different scenarios. As a result, the picture quality and sound quality of various scenes in the TV are too single and the degree of distinction is not high. Users of long-term viewing is likely to cause aesthetic fatigue. To solve this problem, the user needs to manually change the picture quality and sound effects of the current playing scene, which leads to poor user experience.

SUMMARY

The present disclosure provides a method and a system for enhancing sound and picture quality based on scene recognition, and a display, which aims to solve the problem that the user needs to manually adjust the sound quality and picture quality of the current scene, resulting in poor user experience in the prior art.

In order to achieve the above objective, according to a first aspect of the present disclosure, the present disclosure provides a method for enhancing sound and picture quality based on scene recognition, applied to a display, including:

recognizing a real scene reflected in a current screen of the display;

calculating sound and picture quality enhancement parameters matching the real scene; and controlling the display to play sound and picture corresponding to the real scene according to best sound and picture quality corresponding to the sound and picture quality enhancement parameters.

In an embodiment, recognizing a real scene reflected in a current screen of the display includes:

extracting a region image in the current screen;

detecting a scene feature in the region image through a neural network; and recognizing the real scene reflected in the current screen according to the detected scene feature.

In an embodiment, recognizing a real scene reflected in a current screen of the display includes:

recognizing the real scene reflected in the current screen of the display multiple times within a first predetermined time to obtain a confidence level of the real scene recognized each time; and the method further includes:

determining the real scene reflected in the current screen according to the confidence level of the real scene recognized each time.

In an embodiment, the method for enhancing sound and picture quality further includes:

capturing multiple current screens of the display at a predetermined frequency within a second predetermined time;

recognizing a real scene reflected in a current screen of the display includes:

detecting each of the captured current screens to obtain the real scene corresponding to each current screen; and recognizing the real scene reflected in the current screen of the display according to the real scene corresponding to each current screen.

In an embodiment, calculating sound and picture quality enhancement parameters matching the real scene includes:

extracting sound and picture quality parameters of the current screen of the display; and calculating the sound and picture quality enhancement parameters matching the real scene according to preset sound and picture quality parameters corresponding to the best sound and picture quality and the sound and picture quality parameters of the current screen of the display.

In an embodiment, controlling the display to play sound and picture corresponding to the real scene according to best sound and picture quality corresponding to the sound and picture quality enhancement parameters includes:

presetting the best sound and picture quality corresponding to each real scene, or extracting user's commonly-used sound and picture quality of the real scene as the best sound and picture quality corresponding to the real scene; and controlling the display to play the sound and picture corresponding to the best sound and picture quality.

In an embodiment, determining the real scene reflected in the current screen according to the confidence level of the real scene recognized each time includes:

setting a weight value for the confidence level of each recognized real scene;

determining a new confidence level by multiplying each confidence level and the weight value; and determining the real scene reflected in the current screen according to the new confidence level.

In an embodiment, the real scene is an actual scene played on the current screen of the display, and the actual scene includes a movie scene, a news scene, a sports scene and/or a concert scene.

In an embodiment, detecting a scene feature in the region image through a neural network and recognizing the real scene reflected in the current screen according to the detected scene feature includes:

matching an extracted scene feature in the region image with a stored scene feature of the real scene to determine a matching similarity;

calculating the confidence level of the real scene according to the matching similarity; and recognizing the real scene reflected in the current screen according to the confidence level of the real scene.

According to a second aspect of the present disclosure, the present disclosure further provides a system for enhancing sound and picture quality based on scene recognition, applied to a display, including:

a scene recognition module for recognizing a real scene reflected in a current screen of the display;

a quality calculation module for calculating sound and picture quality enhancement parameters matching the real scene; and a play control module for controlling the display to play sound and picture corresponding to the real scene according to best sound and picture quality corresponding to the sound and picture quality enhancement parameters.

In an embodiment, the scene recognition module includes:

an image extraction sub-module for extracting a region image in the current screen;

a feature detection sub-module for detecting a scene feature in the region image through a neural network; and a first scene recognition sub-module for recognizing the real scene reflected in the current screen according to the detected scene feature.

In an embodiment, the scene recognition module is further for recognizing the real scene reflected in the current screen of the display multiple times within a first predetermined time to obtain a confidence level of the real scene recognized each time; and the system further includes:

a scene determination module for determining the real scene reflected in the current screen according to the confidence level of the real scene recognized each time.

In an embodiment, the system for enhancing sound and picture quality further includes:

a screenshot module for capturing multiple current screens of the display at a predetermined frequency within a second predetermined time; and the scene recognition module includes:

a screen detection sub-module for detecting each of the captured current screens to obtain the real scene corresponding to each current screen; and a second scene recognition sub-module for recognizing the real scene reflected in the current screen of the display according to the real scene corresponding to each current screen.

According to a third aspect of the present disclosure, the present disclosure further provides a display, including the system for enhancing sound and picture quality as described above.

In technical solutions of the present disclosure, the method includes automatically recognizing a real scene reflected in a current screen of the display, calculating sound and picture quality enhancement parameters corresponding to the real scene; and controlling the display to automatically play sound and picture corresponding to the real scene according to best sound and picture quality corresponding to the sound and picture quality enhancement parameters, which brings users a high level of audio-visual enjoyment, and eliminates the need for manual adjustment by the user and improves the user experience. This solution solves the problem that the user needs to manually adjust the sound quality and picture quality of the current scene, resulting in poor user experience in the prior art.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, but not to limit the present disclosure.

In the related art, the traditional display usually needs to manually adjust the sound quality and picture quality corresponding to the current scene, which easily leads to poor user experience.

Figure 1:
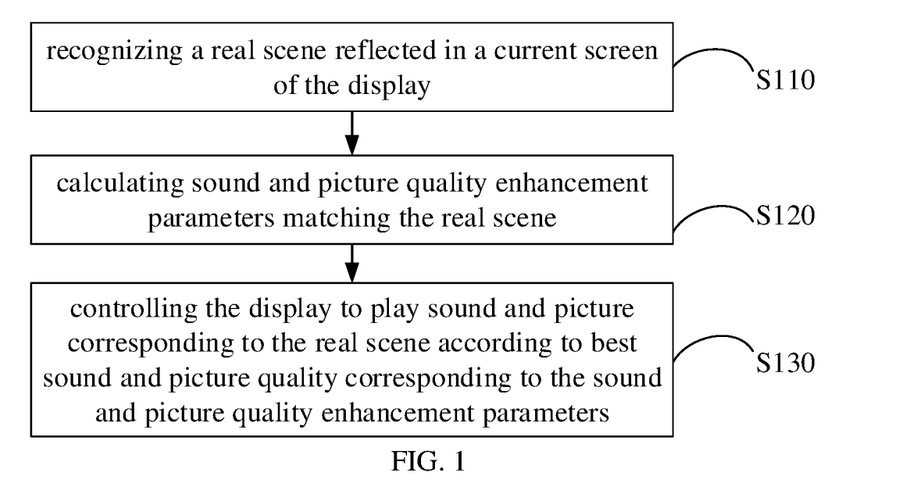
FIG. 1 is a schematic flow diagram of a method for enhancing sound and picture quality based on scene recognition according to a first embodiment of the present disclosure.

As shown in FIG. 1, in order to solve the above problem, FIG. 1 is a schematic flow diagram of a method for enhancing sound and picture quality based on scene recognition according to a first embodiment of the present disclosure. As shown in FIG. 1, the method for enhancing sound and picture quality is applied to a display, including the following operations:

S110: recognizing a real scene reflected in a current screen of the display.

The real scene is the actual scene played on the current screen of the display (such as a smart TV), such as a movie scene, a news scene, a sports scene, or a concert scene. The sound quality and picture quality that should be used in the real scene can be determined by obtaining the real scene.

Figure 2:
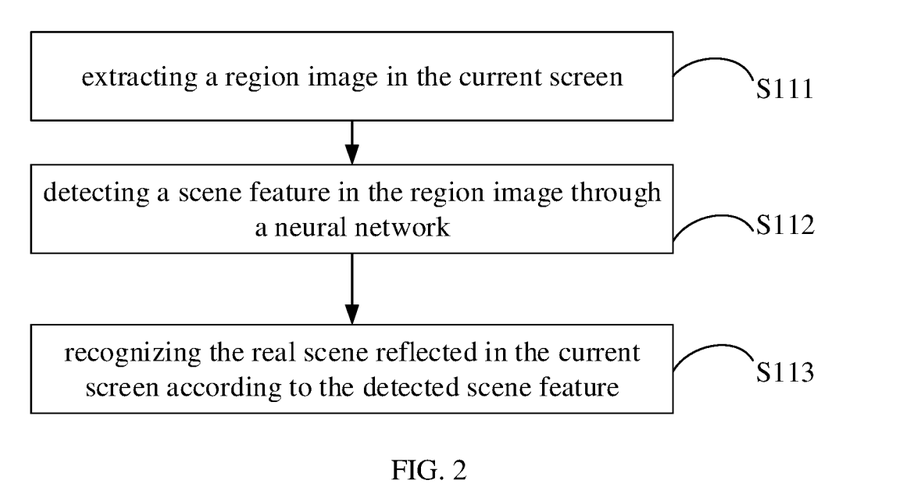
FIG. 2 is a schematic flow diagram of a method for recognizing a real scene shown in FIG. 1.

The method for recognizing the real scene can be recognized by artificial intelligence, and the current screen can be accurately determined by a neural network that has been trained in advance. As shown in FIG. 2, recognizing a real scene reflected in a current screen of the display includes:

S111: extracting a region image in the current screen. The neural network will perform machine learning on the current screen of the display, and extract the region image of a specific area in the current screen. For example, in a movie screen, a lower part of the current screen is often a black frame. In sports programs, there are often score signs in an upper right corner of the screen. According to the method learned by the machine, the neural network will focus on a specific area of the current screen, so as to extract the region image in the current screen.

S112: detecting a scene feature in the region image through a neural network.

In an embodiment, the neural network will extract the scene feature in the region image, and match the scene feature with a scene feature of the real scene stored in the database, and calculate the confidence level of the real scene based on the similarity of the scene feature.

S113: recognizing the real scene reflected in the current screen according to the detected scene feature.

In an embodiment, the scene feature in the region image is matched with scene features of the real scenes stored in the database, and a matching degree of a real scene is calculated through a matching similarity. When the confidence level of the real scene is greater than a predetermined value, the real scene reflected in the current screen can be determined. For example, a confidence level of a news scene is 0.8, and a confidence level of the sports scene is 0.2, through matching the scene feature of the current screen. At this time, it can be determined that the real scene reflected in the current screen of the display is a news scene.

After recognizing the real scene reflected in the current screen of the display, the method shown in FIG. 1 further includes the following operations:

S120: calculating sound and picture quality enhancement parameters matching the real scene. The sound and picture quality enhancement parameters respectively include a sound quality enhancement parameter and a picture quality enhancement parameter. The sound and picture quality enhancement parameters are calculated based on the best sound quality and best picture quality corresponding to the real scene, and the sound quality and picture quality corresponding to the current screen of the display. The sound quality and picture quality corresponding to the real scene can be adjusted to the best through calculating the sound and picture quality enhancement parameters that match the real scene.

Figure 3:
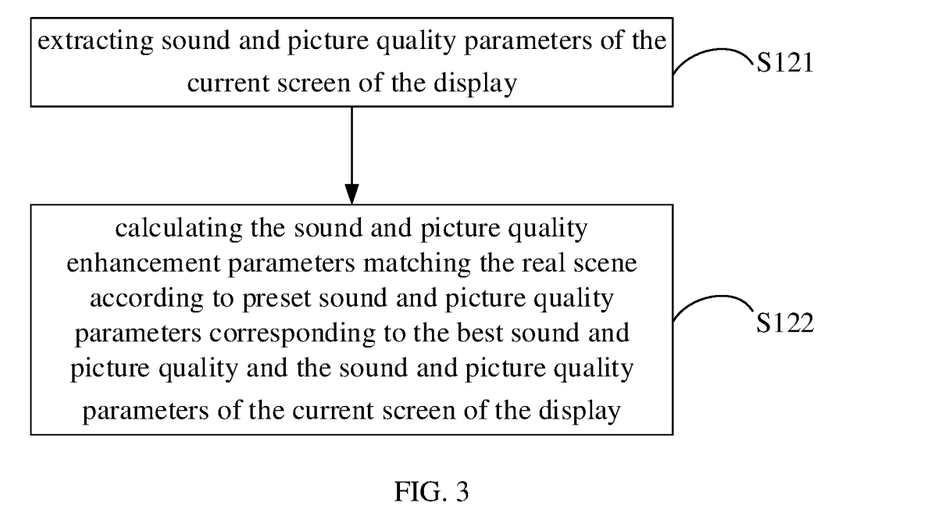
FIG. 3 is a schematic flow diagram of a method for calculating sound and picture quality enhancement parameters shown in FIG. 1.

As shown in FIG. 3, the operation S120 of calculating sound and picture quality enhancement parameters matching the real scene includes:

S121: extracting sound and picture quality parameters of the current screen of the display. The current sound quality parameter and picture quality parameter of the display are usually inconsistent with the best sound quality parameter and the best picture quality parameter corresponding to the real scene. In order to adjust the picture and sound quality of the current screen of the display to the best picture and sound quality corresponding to the real scene, it is first necessary to extract the sound and picture quality parameters of the current screen of the display. Therefore, the picture quality and sound effect of the real scene are enhanced according to the comparison between the sound and picture quality parameters and the best sound and picture quality parameters.

S122: calculating the sound and picture quality enhancement parameters matching the real scene according to preset sound and picture quality parameters corresponding to the best sound and picture quality and the sound and picture quality parameters of the current screen of the display.

Since the sound and picture quality parameters of the current screen of the display are often different from the preset sound and picture quality parameters corresponding to the best sound and picture quality, it is necessary to make specific modifications to specific parameters, such as contrast, hue, brightness and resolution. The difference between the sound and picture quality parameters of the current screen of the above-mentioned display and the preset sound and picture quality parameters is calculated as a parameter value of the sound and picture quality enhancement that matches the real scene, so that the sound quality and picture quality of the current screen of the display reach the best sound quality and the best picture quality.

After calculating the sound and picture quality enhancement parameters matching the real scene, the method shown in FIG. 1 further includes:

S130: controlling the display to play sound and picture corresponding to the real scene according to best sound and picture quality corresponding to the sound and picture quality enhancement parameters. The best sound and picture quality can be preset by the system, such as extracting each user's sound and picture quality evaluation for a specific scene through big data, combining the display and sound effect requirements of each real scene, and formulating curve fitting, or can be determined according to the sound and picture quality usually set by a specific user. Through the sound and picture quality enhancement parameters corresponding to the best sound and picture quality, the display is controlled to play the sound and picture corresponding to the real scene, which can bring users extremely high audiovisual enjoyment and improve user experience.

Figure 4:
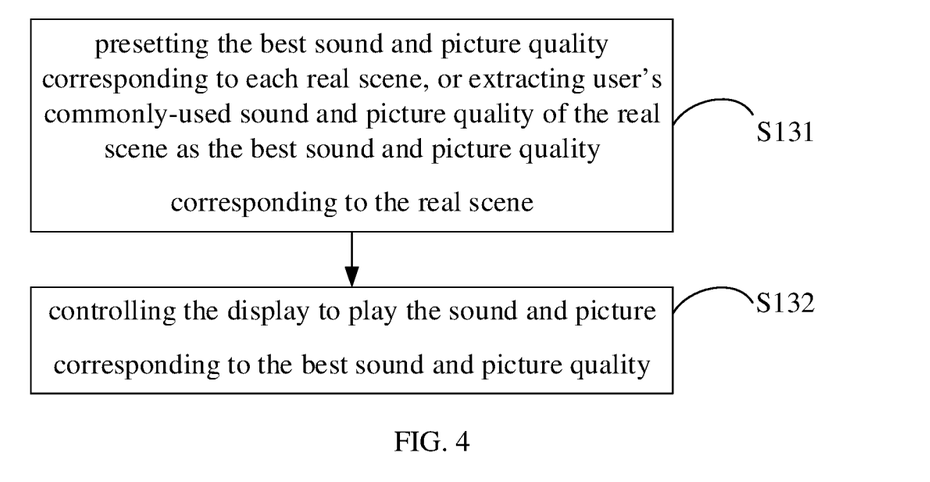
FIG. 4 is a schematic flow diagram of a method for controlling the display to play shown in FIG. 1.

As shown in FIG. 4, the operation S130 of controlling the display to play sound and picture corresponding to the real scene according to best sound and picture quality corresponding to the sound and picture quality enhancement parameters includes:

S131: presetting the best sound and picture quality corresponding to each real scene, or extracting user's commonly-used sound and picture quality of the real scene as the best sound and picture quality corresponding to the real scene.

S132: controlling the display to play the sound and picture corresponding to the best sound and picture quality.

The best sound and picture quality can be preset according to big data extraction, or the sound and picture quality set by the user each time watching the same scene are extracted on the spot, and then be processed to obtain the best sound and picture quality suitable for the user. Then, the display is controlled to play the sound and picture corresponding to the best sound and picture quality, so that the user does not need to manually adjust the sound and picture quality, and the user experience is improved.

In summary, in technical solutions of the present disclosure, the method includes automatically recognizing a real scene reflected in a current screen of the display, calculating sound and picture quality enhancement parameters corresponding to the real scene; and controlling the display to automatically play sound and picture corresponding to the real scene according to best sound and picture quality corresponding to the sound and picture quality enhancement parameters, which brings users a high level of audio-visual enjoyment, and eliminates the need for manual adjustment by the user and improves the user experience. This solution solves the problem that the user needs to manually adjust the sound quality and picture quality of the current scene, resulting in poor user experience in the prior art.

Besides, the neural network may have misjudgments in the judgment of the real scene. This may not only fail to match the best sound and picture quality corresponding to the real scene, but also affect the user's audiovisual effect due to the matching error.

Figure 5:
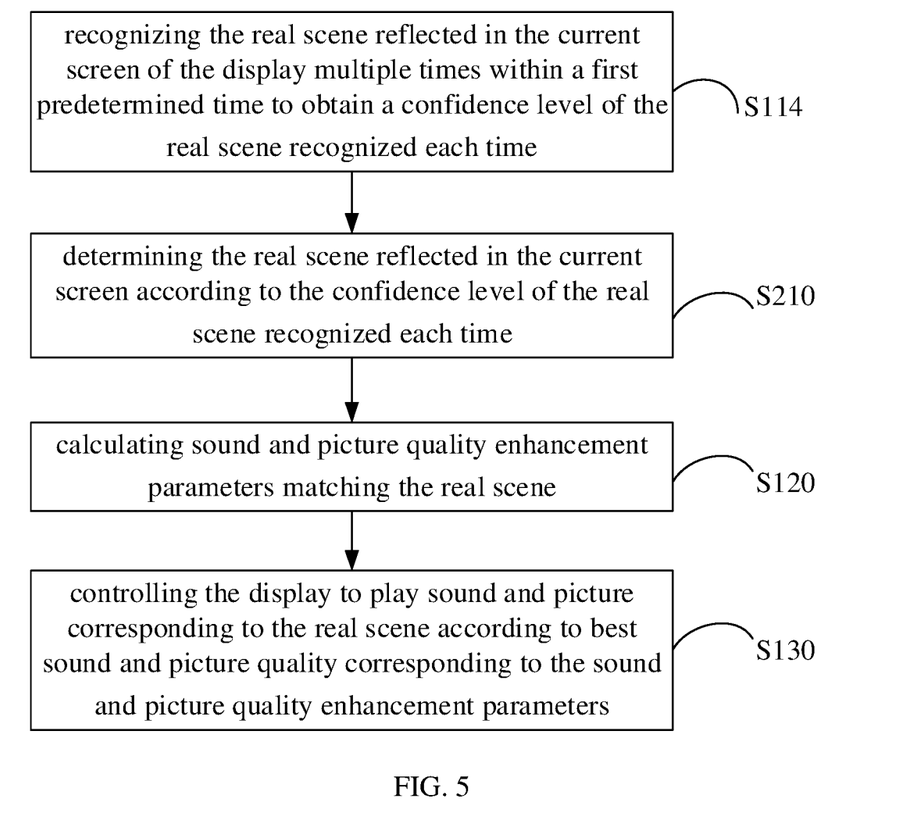
FIG. 5 is a schematic flow diagram of the method for enhancing sound and picture quality based on scene recognition according to a second embodiment of the present disclosure.

In order to solve the above problem, as shown in FIG. 5, FIG. 5 is a schematic flow diagram of the method for enhancing sound and picture quality based on scene recognition according to a second embodiment of the present disclosure. In this embodiment, recognizing a real scene reflected in a current screen of the display includes:

S114: recognizing the real scene reflected in the current screen of the display multiple times within a first predetermined time to obtain a confidence level of the real scene recognized each time.

By recognizing the real scene reflected in the current screen multiple times, misjudgment of the real scene can be reduced. For specific situations, for example, the user switches the display screen multiple times in a short time, and through multiple identifications, the current screen the user is finally positioned can be accurately determined. The confidence level reflects the credibility of the neural network to recognize the real scene. The operation of recognizing the real scene reflected in the current screen multiple times includes two ways of simultaneously recognizing multiple times and sequentially recognizing multiple times.

The method for enhancing sound and picture quality shown in FIG. 5 further includes:

Operation S210: determining the real scene reflected in the current screen according to the confidence level of the real scene recognized each time.

In an embodiment, the weight value can be set for the confidence level of each recognition. For example, in the case of sequentially recognizing real scenes in chronological order, you can set the weight value of the real scene recognized a predetermined number of times later to be higher, and the weight value of the real scene recognized before to be lower. A new confidence level is obtained by multiplying the confidence level and the weight value, so as to determine whether the current screen reflects a real scene through the new confidence level. The above method can effectively reduce the situation of real scene recognition errors caused by the user frequently switching the display screen.

In technical solutions of the embodiments of the present disclosure, the confidence level of each recognition is obtained by recognizing the real scene reflected in the current screen of the display several times. The real scene reflected in the current screen is determined by recognizing the confidence level of the real scene each time, thereby reducing the misjudgment of the real scene in the above operations.

The current screen of the display may switch frequently, which may cause inaccurate recognition of the real scene. In order to solve the problem, as shown in FIG. 6, in addition to the operations shown in FIG. 1, the method for enhancing sound and picture quality provided in this embodiment further includes the following operations:

S310: capturing multiple current screens of the display at a predetermined frequency within a second predetermined time.

For example, after the display enters a specific screen for 2 s, the screen is taken at a frequency of 300 ms/time within 2 s to capture a large number of screens, and then the neural network performs feature analysis on the captured screens. Through the screenshot operation, a large number of screens can be obtained, thereby improving the accuracy of real scene recognition.

Figure 6:
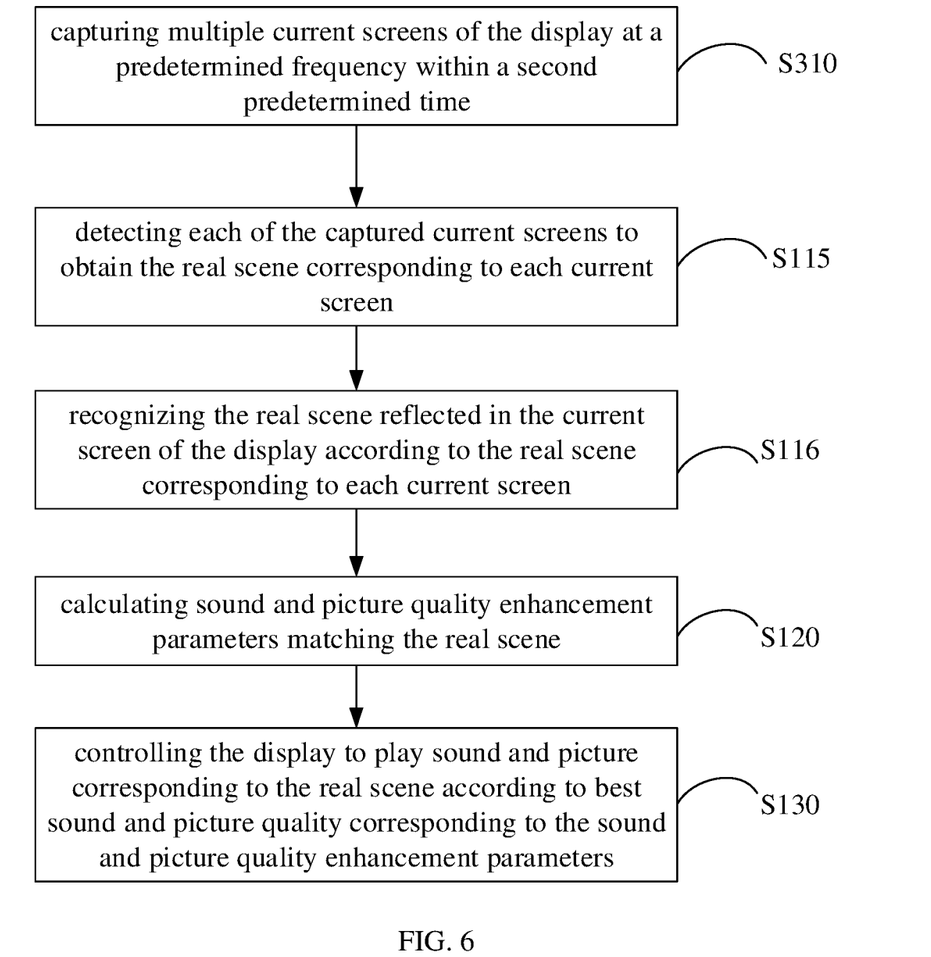
FIG. 6 is a schematic flow diagram of the method for enhancing sound and picture quality based on scene recognition according to a third embodiment of the present disclosure.

In an embodiment shown in FIG. 6, the operation S110 of recognizing a real scene reflected in a current screen of the display includes:

S115, detecting each of the captured current screens to obtain the real scene corresponding to each current screen.

S116, recognizing the real scene reflected in the current screen of the display according to the real scene corresponding to each current screen.

In technical solutions of the present disclosure, a large number of current screens are captured, and then each current screen is detected separately to obtain the real scene corresponding to each current screen, so that the real scene reflected by the current screen of the display can be recognized, and the accuracy of recognizing the real scene can be improved.

Figure 7:
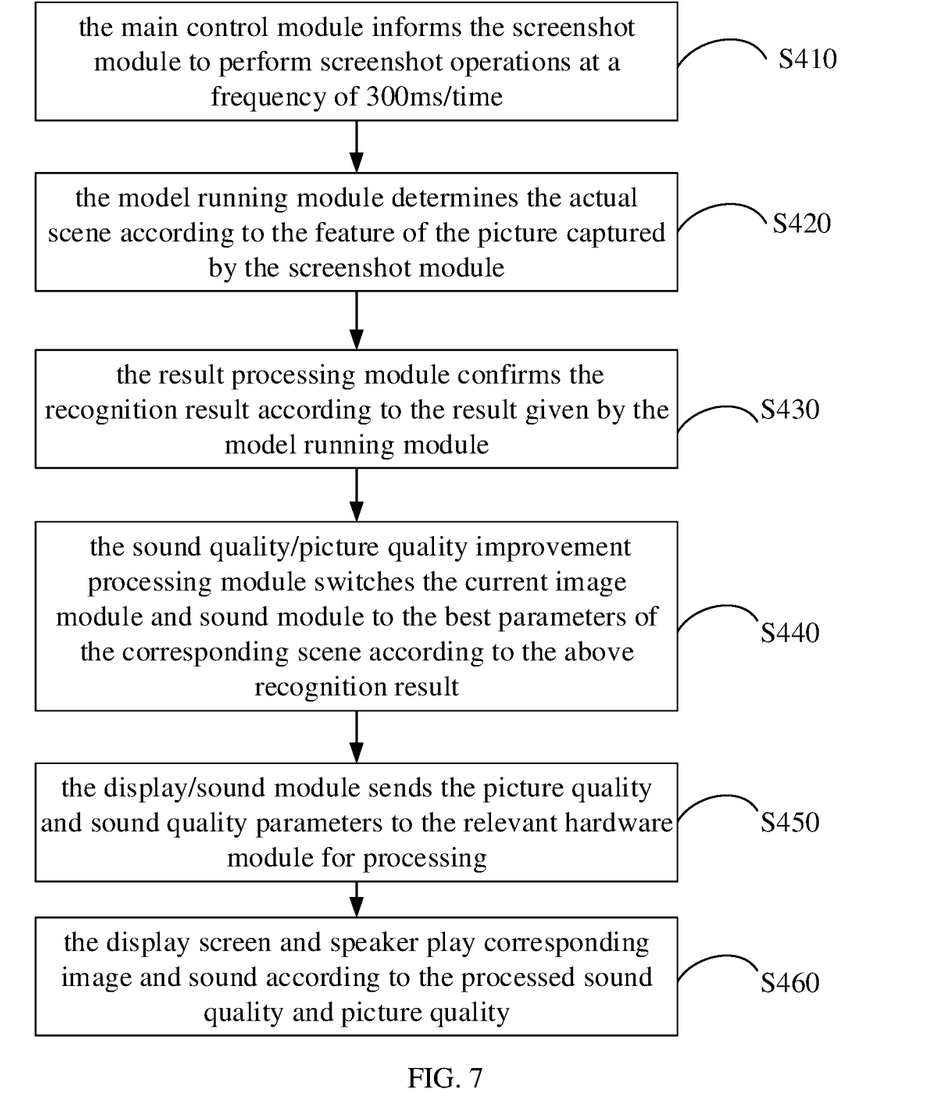
FIG. 7 is a schematic flow diagram of the method for enhancing sound and picture quality based on scene recognition according to a fourth embodiment of the present disclosure.

Besides, as shown in FIG. 7, FIG. 7 is a schematic flow diagram of the method for enhancing sound and picture quality based on scene recognition according to a fourth embodiment of the present disclosure. The hardware system that the method for enhancing sound and picture quality relies on includes: a main control module, a screenshot module, a model running module, a result processing module, a sound/picture quality improvement processing module, a display/sound module, a display and a speaker. As shown in FIG. 7, the method for enhancing sound and picture quality includes the following operations:

S410: when the user is watching a TV program, if the set-top box is turned on, the main control module informs the screenshot module to perform screenshot operations at a frequency of 300 ms/time.

S420: the model running module determines the actual scene according to the feature of the picture captured by the screenshot module.

The screenshots are provided to the model running module in the form of data stream. The model run by this module needs a lot of training before being imported into the system, and can make accurate judgments of the actual scene based on the picture.

Based on the above two points, for example, when a user is watching news, the model running module will receive a screenshot of the news scene and give the recognition result based on the typical feature of the picture. The typical feature of the picture is that the bottom of the picture has a blue stripe and white text, and the model gives the recognition result based on the feature.

S430: the result processing module confirms the recognition result according to the result given by the model running module. For example: when the model running module judges that the real scenes corresponding to the current screen are news (0.8) and sports (0.2) (the above number is the confidence level, that is, the confidence probability), and further provides accurate results. It should be noted that the above model is not a result, but a comprehensive result with weights, which is also the basis for the existence of the module. Further, the result processing module will also determine whether there is a misjudgment. For example, if the results are the same three times in a row, it can be considered that the scene played by the display is actually switched, which can effectively prevent misjudgment of jitter recognition.

S440: the sound quality/picture quality improvement processing module switches the current image module and sound module to the best parameters of the corresponding scene (such as news) according to the above recognition result. The sound quality/picture quality improvement processing module will switch the current image mode and sound mode to the best parameters of the news mode.

S450: the display/sound module sends the picture quality and sound quality parameters to the relevant hardware module for processing. In an embodiment, the picture quality and sound quality parameters of the above news mode will be sent to the relevant hardware module for processing in the display/sound module.

S460: the display screen and speaker play corresponding image and sound according to the processed sound quality and picture quality.

In an embodiment, the processed picture quality and sound quality parameters are restored in the form of electrical signals on the display screen and speakers, so that users do not need to switch manually when watching news programs, and the system automatically switches the picture and sound to the most suitable mode for the scene.

Further, when the user is watching pictures of other scenes, for example, when the user is watching a movie, the above process will automatically switch the related picture and sound mode to the movie mode.

In addition, the foregoing embodiments of the present disclosure can be developed and implemented based on the android nn interface. With the iteration of the android operating system, after the release of the android 8.0 version, the android operating system provides a set of android nn interfaces, such that the developers develop convolution algorithms based on the android nn interface, which can train related models in advance. The training principle of the model is as follows: a large amount of materials are provided to the model, and after the model recognizes the above materials, it performs manual correction. Through continuous training, the accuracy of the model's recognition of materials can be improved. The recognition process can run on a separate hardware ip unit, and does not occupy the central processing unit (CPU), graphics processing unit (GPU), and network processing unit (NPU) resources of the main chip SOC, so that artificial intelligence recognition can be performed without responding to the normal use of the TV.

Based on the same concept of the foregoing method embodiment, an embodiment of the present disclosure also provides a system for enhancing sound and picture quality based on scene recognition, configured for implementing the foregoing method of the present disclosure. Since the principle and method of solving the problem in this system embodiment are similar, it has at least all the beneficial effects brought about by the technical solution of the above-mentioned embodiments, which will not be repeated here.

Figure 8:
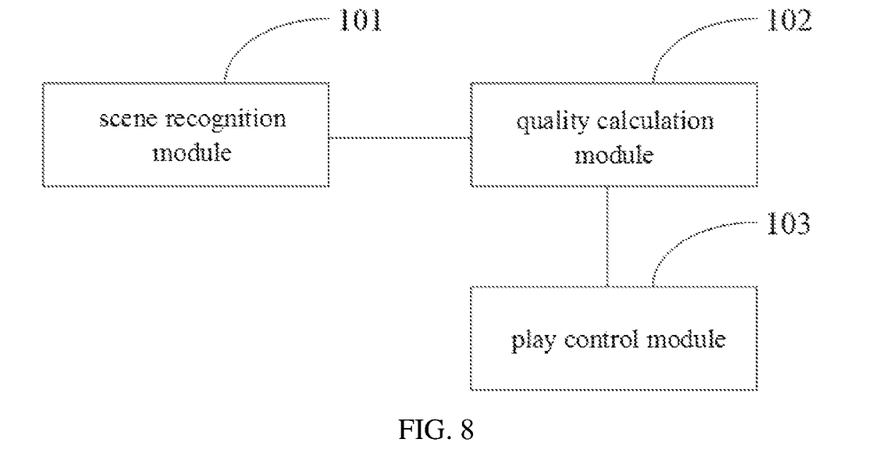
FIG. 8 is a schematic structural diagram of a system for enhancing sound and picture quality based on scene recognition according to a first embodiment of the present disclosure.

As shown in FIG. 8, FIG. 8 is a schematic structural diagram of a system for enhancing sound and picture quality based on scene recognition according to a first embodiment of the present disclosure. The system for enhancing sound and picture quality includes:

a scene recognition module 101 for recognizing a real scene reflected in a current screen of the display.

Figure 9:
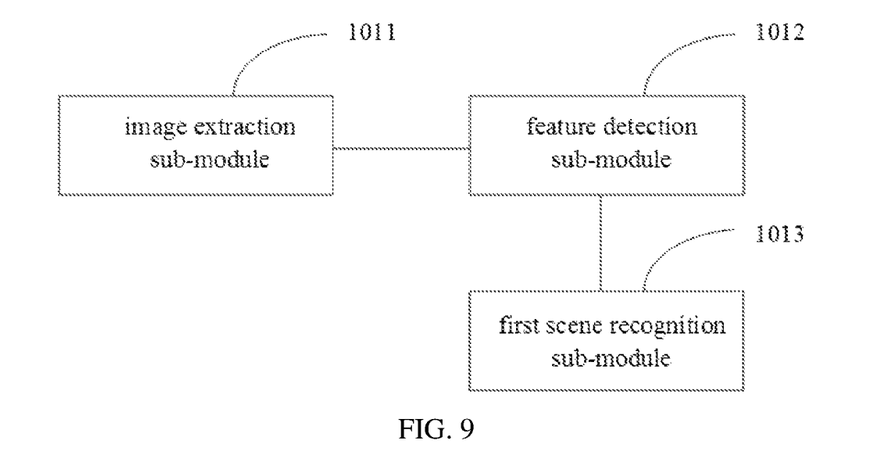
FIG. 9 is a schematic structural diagram of a scene recognition module shown in FIG. 8.

The structure of the scene recognition module 101 refers to FIG. 9. As shown in FIG. 9, the scene recognition module 101 includes:

an image extraction sub-module 1011 for extracting a region image in the current screen;

a feature detection sub-module 1012 for detecting a scene feature in the region image through a neural network; and a first scene recognition sub-module 1013 for recognizing the real scene reflected in the current screen according to the detected scene feature.

The system for enhancing sound and picture quality shown in FIG. 8 further includes:

a quality calculation module 102 for calculating sound and picture quality enhancement parameters matching the real scene; and a play control module 103 for controlling the display to play sound and picture corresponding to the real scene according to best sound and picture quality corresponding to the sound and picture quality enhancement parameters.

In technical solutions of the present disclosure, automatically recognizing a real scene reflected in a current screen of the display, calculating sound and picture quality enhancement parameters corresponding to the real scene; and controlling the display to automatically play sound and picture corresponding to the real scene according to best sound and picture quality corresponding to the sound and picture quality enhancement parameters, brings users a high level of audio-visual enjoyment, and eliminates the need for manual adjustment by the user and improves the user experience. This solution solves the problem that the user needs to manually adjust the sound quality and picture quality of the current scene, resulting in poor user experience in the prior art.

Figure 10:
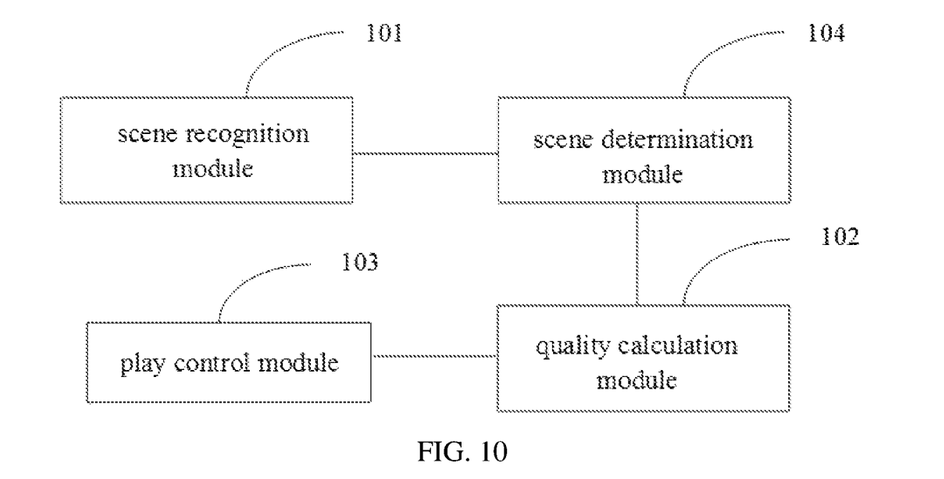
FIG. 10 is a schematic structural diagram of the system for enhancing sound and picture quality based on scene recognition according to a second embodiment of the present disclosure.

Besides, as shown in FIG. 10, the scene recognition module 101 is further for recognizing the real scene reflected in the current screen of the display multiple times within a first predetermined time to obtain a confidence level of the real scene recognized each time. In addition to the modules shown in FIG. 9, the system for enhancing sound and picture quality shown in FIG. 10 also includes a scene determination module 104 for determining the real scene reflected in the current screen according to the confidence level of the real scene recognized each time.

Figure 11:
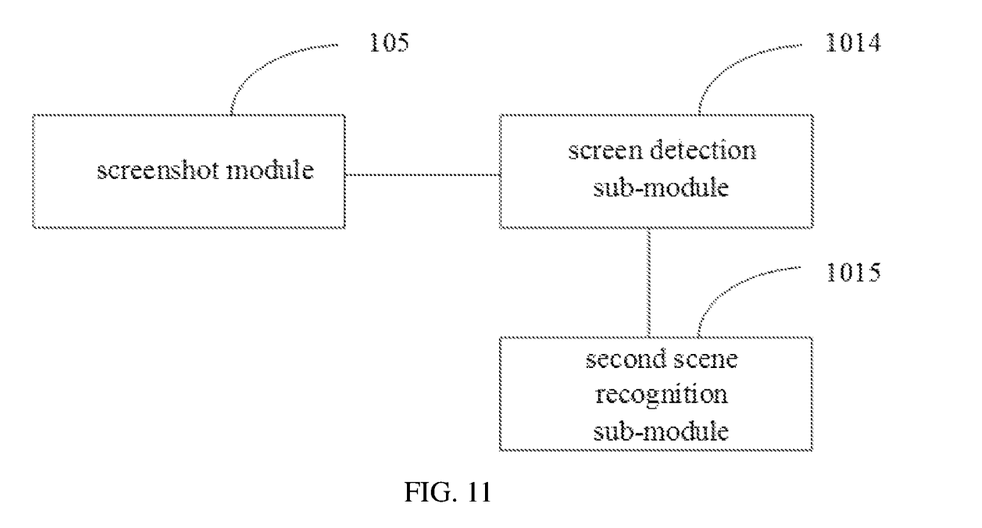
FIG. 11 is a schematic structural diagram of the system for enhancing sound and picture quality based on scene recognition according to a third embodiment of the present disclosure.

Besides, as shown in FIG. 11, in addition to the modules shown in FIG. 9, the system for enhancing sound and picture quality shown provided by this embodiment also includes:

a screenshot module 105 for capturing multiple current screens of the display at a predetermined frequency within a second predetermined time; and the scene recognition module 101 includes:

a screen detection sub-module 1014 for detecting each of the captured current screens to obtain the real scene corresponding to each current screen; and a second scene recognition sub-module 1015 for recognizing the real scene reflected in the current screen of the display according to the real scene corresponding to each current screen.

Figure 12:
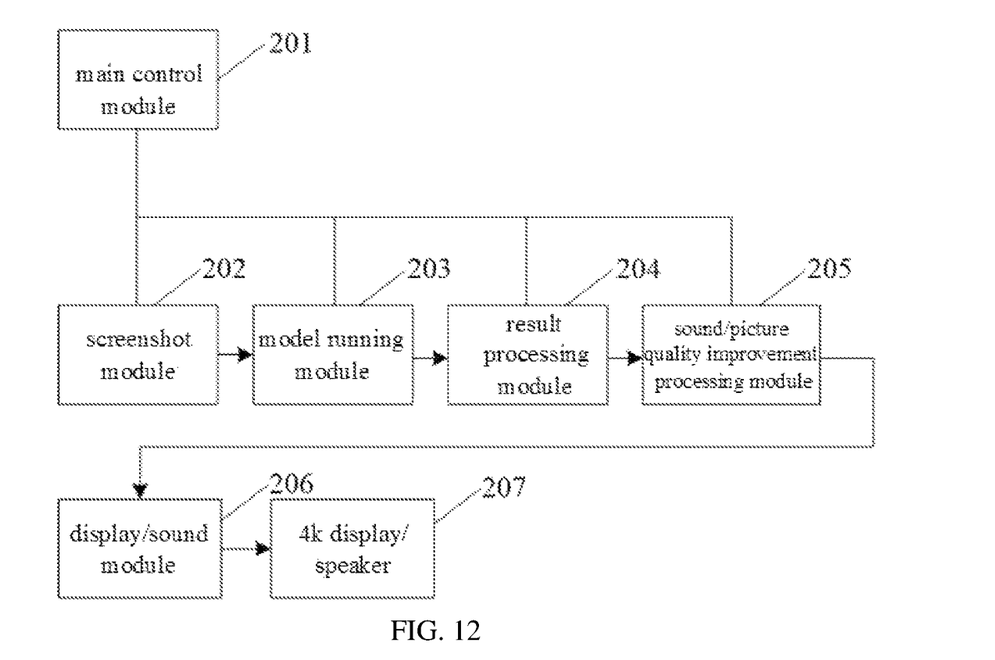
FIG. 12 is a schematic structural diagram of the system for enhancing sound and picture quality based on scene recognition according to a fourth embodiment of the present disclosure.

As shown in FIG. 12, FIG. 12 is a schematic structural diagram of the system for enhancing sound and picture quality based on scene recognition according to a fourth embodiment of the present disclosure. The system for enhancing sound and picture quality includes:

a main control module 201, a screenshot module 202, a model running module 203, a result processing module 204, a sound/picture quality improvement processing module 205, a display/sound module 206, a 4k display and a speaker 207. The main control module 201 is configured to coordinate the operation of the screenshot module 202, the model running module 2030, the recognition result processing module 204, and the sound/picture quality improvement processing module 205.

The workflow of the system for enhancing sound and picture quality is as follows:

When the user is watching a TV program, such as when the set-top box is turned on, the main control module 201 notifies the screenshot module 202 to perform a screenshot operation at a frequency of 300 ms/time.

The model running module 203 determines the real scene according to the feature of the picture captured by the screenshot module. The screenshots are provided to the model running module 203 in the form of a data stream. The model (tflite) run by the module needs to undergo a lot of training before being imported into the system, and can make accurate judgments of real scenes based on pictures.

The recognition result processing module 204 confirms the recognition result according to the result given by the model running module 203.

According to the above recognition result, the sound/picture quality improvement processing module 205 switches the current picture module and sound module to the best parameters of the corresponding scene.

The display/sound module 206 transmits the picture quality and sound quality parameters to the relevant hardware module for processing.

The 4K display and the speaker 207 play corresponding picture and sound according to the processed sound quality and picture quality.

Besides, the embodiments of the present disclosure further provide a display, including the system for enhancing sound and picture quality of any embodiment described above.

Those skilled in the art should understand that the embodiments of the present disclosure can be provided as methods, systems, or computer program products. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processors of general-purpose computers, special-purpose computers, embedded processors, or other programmable data processing equipment to produce a machine, such that the instructions executed by the processor of a computer or other programmable data processing equipment generate a device for realizing the functions specified in one or more processes in the flowchart and/or one block or more in the block diagram.

These computer program instructions can also be stored in a computer-readable memory that can guide a computer or other programmable data processing equipment to work in a specific manner, such that the instructions stored in the computer-readable memory produce an article of manufacture including an instruction device that implements the functions specified in one or more processes in the flowchart and/or one block or more in the block diagram.

These computer program instructions can also be loaded on a computer or other programmable data processing equipment, so that a series of operation steps are executed on the computer or other programmable equipment to produce computer-implemented processing, such that the instructions executed on the computer or other programmable devices provide steps for implementing the functions specified in one or more processes in the flowchart and/or one block or more in the block diagram.

It should be noted that in the claims, any reference signs located between parentheses should not be constructed as limitations on the claims. The word "comprising" does not exclude the presence of components or operations not listed in the claims. The word "a" or "an" preceding a component does not exclude the presence of multiple such components. The present disclosure can be realized by means of hardware including several different components and by means of a suitably programmed computer. In the unit claims enumerating several devices, several of these devices may be embodied in the same hardware item. The use of the words first, second, and third does not indicate any order. These words can be interpreted as names.

Although the preferred embodiments of the present disclosure have been described, those skilled in the art can make additional changes and modifications to these embodiments once they learn the basic creative concept. Therefore, the appended claims are intended to be interpreted as including the preferred embodiments and all changes and modifications falling within the scope of the present disclosure.

Obviously, those skilled in the art can make various changes and modifications to the present disclosure without departing from the spirit and scope of the present disclosure. If these modifications and variations of the present disclosure fall within the scope of the claims of the present disclosure and their equivalent technologies, the present disclosure also intends to include these modifications and variations.

What is claimed is:

1. A method for enhancing sound and picture quality based on scene recognition, applied to a display, comprising:
    recognizing a real scene reflected in a current screen of the display multiple times within a first predetermined time to obtain a confidence level of the real scene recognized each time;
    determining the real scene reflected in the current screen according to the confidence level of the real scene recognized each time, wherein a weight value is set for the confidence level of each recognized real scene, and/or when the real scene is recognized in chronological order, the weight value of the real scene recognized later is higher than the weight value of the real scene recognized before within a predetermined number of times, and a new confidence level is obtained by multiplying each confidence level and the weight value, to determine whether the current screen reflects the real scene according to the new confidence level;
    calculating sound and picture quality enhancement parameters matching the real scene wherein each of the sound and picture quality enhancement parameters is a difference between a sound and picture quality parameter of the current screen and a preset sound and picture quality parameter; and
    controlling the display to play sound and picture corresponding to the real scene according to sound and picture quality corresponding to the sound and picture quality enhancement parameters.

2. The method for enhancing sound and picture quality of claim 1, wherein recognizing the real scene reflected in the current screen of the display comprises:
    extracting a region image in the current screen;
    detecting a scene feature in the region image through a neural network; and
    recognizing the real scene reflected in the current screen according to the detected scene feature.

3. The method for enhancing sound and picture quality of claim 2, wherein detecting a scene feature in the region image through a neural network and recognizing the real scene reflected in the current screen according to the detected scene feature comprises:
    matching an extracted scene feature in the region image with a stored scene feature of the real scene to determine a matching similarity;
    calculating the confidence level of the real scene according to the matching similarity; and
    recognizing the real scene reflected in the current screen according to the confidence level of the real scene.

4. The method for enhancing sound and picture quality of claim 1, further comprising:
    capturing multiple current screens of the display at a predetermined frequency within a second predetermined time;
    wherein recognizing the real scene reflected in the current screen of the display comprises:
    detecting each of the captured current screens to obtain the real scene corresponding to each current screen; and
    recognizing the real scene reflected in the current screen of the display according to the real scene corresponding to each current screen.

5. The method for enhancing sound and picture quality of claim 1, wherein calculating sound and picture quality enhancement parameters matching the real scene comprises:
    extracting sound and picture quality parameters of the current screen of the display; and
    calculating the sound and picture quality enhancement parameters matching the real scene according to preset sound and picture quality parameters corresponding to the sound and picture quality and the sound and picture quality parameters of the current screen of the display.

6. The method for enhancing sound and picture quality of claim 1, wherein controlling the display to play sound and picture corresponding to the real scene according to sound and picture quality corresponding to the sound and picture quality enhancement parameters comprises:
    presetting the sound and picture quality corresponding to each real scene, or extracting user's commonly-used sound and picture quality of the real scene as the sound and picture quality corresponding to the real scene; and
    controlling the display to play the sound and picture corresponding to the sound and picture quality.

7. The method for enhancing sound and picture quality of claim 1, wherein the real scene is an actual scene played on the current screen of the display, and the actual scene includes a movie scene, a news scene, a sports scene and/or a concert scene.

8. A system for enhancing sound and picture quality based on scene recognition, applied to a display, comprising:
    a scene recognition module for recognizing a real scene reflected in a current screen of the display multiple times within a first predetermined time to obtain a confidence level of the real scene recognized each time and determining the real scene reflected in the current screen according to the confidence level of the real scene recognized each time, wherein a weight value is set for the confidence level of each recognized real scene, and/or when the real scene is recognized in chronological order, the weight value of the real scene recognized later is higher than the weight value of the real scene recognized before within a predetermined number of times, and a new confidence level is obtained by multiplying each confidence level and the weight value, to determine whether the current screen reflects the real scene according to the new confidence level;
    a quality calculation module for calculating sound and picture quality enhancement parameters matching the real scene, wherein each of the sound and picture quality enhancement parameters is a difference between a sound and picture quality parameter of the current screen and a preset sound and picture quality parameter; and
    a play control module for controlling the display to play sound and picture corresponding to the real scene according to sound and picture quality corresponding to the sound and picture quality enhancement parameters.

9. The system for enhancing sound and picture quality of claim 8, wherein the scene recognition module comprises:
    an image extraction sub-module for extracting a region image in the current screen;
    a feature detection sub-module for detecting a scene feature in the region image through a neural network; and
    a first scene recognition sub-module for recognizing the real scene reflected in the current screen according to the detected scene feature.

10. The system for enhancing sound and picture quality of claim 8, further comprising:
- a screenshot module for capturing multiple current screens of the display at a predetermined frequency within a second predetermined time; and wherein the scene recognition module comprises:
- a screen detection sub-module for detecting each of the captured current screens to obtain the real scene corresponding to each current screen; and
- a second scene recognition sub-module for recognizing the real scene reflected in the current screen of the display according to the real scene corresponding to each current screen.

11. The system for enhancing sound and picture quality of claim 8, wherein the quality calculation module is for extracting sound and picture quality parameters of the current screen of the display, and for calculating the sound and picture quality enhancement parameters matching the real scene according to preset sound and picture quality parameters corresponding to the sound and picture quality and the sound and picture quality parameters of the current screen of the display.

12. The system for enhancing sound and picture quality of claim 8, wherein the play control module is for presetting the sound and picture quality corresponding to each real scene, or for extracting user's commonly-used sound and picture quality of the real scene as the sound and picture quality corresponding to the real scene, and for controlling the display to play the sound and picture corresponding to the sound and picture quality.

13. The system for enhancing sound and picture quality of claim 8, wherein the real scene is an actual scene played on the current screen of the display, and the actual scene includes a movie scene, a news scene, a sports scene and/or a concert scene.

14. A display, comprising the system for enhancing sound and picture quality of claim 8.

\* \* \* \* \*